(12) United States Patent
Henn et al.

(10) Patent No.: US 8,838,088 B1
(45) Date of Patent: Sep. 16, 2014

(54) SYSTEM, METHOD, AND COMPUTER PROGRAM FOR POLICY DRIVEN CONTROL OF A NETWORKED MOBILE DEVICE OF A MOTOR VEHICLE DRIVER

(75) Inventors: Nir Henn, Ramat Hasharon (IL); Gil Rosen, Tel Mond (IL)

(73) Assignee: Amdocs Software Systems Limited, Dublin 3 (IE)

( * ) Notice: Subject to any disclaimer, the term of this patent is extended or adjusted under 35 U.S.C. 154(b) by 149 days.

(21) Appl. No.: 13/338,165

(22) Filed: Dec. 27, 2011

(51) Int. Cl.
*H04M 3/00* (2006.01)

(52) U.S. Cl.
USPC ..... 455/419; 455/411; 455/569.2; 455/575.9; 455/420; 455/456.4

(58) Field of Classification Search
USPC ........ 455/418–420, 569.1–569.2, 575.9, 557, 455/41.2
See application file for complete search history.

(56) References Cited

U.S. PATENT DOCUMENTS

| | | | |
|---|---|---|---|
| 8,145,199 B2* | 3/2012 | Tadayon et al. | 455/418 |
| 8,254,902 B2* | 8/2012 | Bell et al. | 455/419 |
| 8,270,933 B2* | 9/2012 | Riemer et al. | 455/345 |
| 8,489,085 B2* | 7/2013 | Simmons | 455/420 |
| 2008/0070609 A1 | 3/2008 | Ackley | |
| 2011/0009107 A1* | 1/2011 | Guba et al. | 455/418 |
| 2011/0021234 A1* | 1/2011 | Tibbitts et al. | 455/517 |
| 2011/0093161 A1* | 4/2011 | Zhou et al. | 701/33 |
| 2011/0105097 A1* | 5/2011 | Tadayon et al. | 455/418 |
| 2011/0196571 A1 | 8/2011 | Foladare et al. | |
| 2012/0040665 A1* | 2/2012 | Liu et al. | 455/426.1 |
| 2012/0164968 A1* | 6/2012 | Velusamy et al. | 455/404.2 |
| 2012/0283894 A1* | 11/2012 | Naboulsi | 701/1 |
| 2013/0035063 A1* | 2/2013 | Fisk et al. | 455/410 |

OTHER PUBLICATIONS

Associated Press, "New Devices Aim to Disable Cell Phones While Driving," Fox News, Jan. 18, 2009, retrieved from http://www.foxnews.com/story/0,2933,480585,00.html.

* cited by examiner

*Primary Examiner* — Sharad Rampuria
(74) *Attorney, Agent, or Firm* — Zilka-Kotab, PC

(57) ABSTRACT

A system, method, and computer program product are provided for policy driven control of a networked mobile device of a motor vehicle driver. In use, a user operating a motor vehicle is detected. Additionally, a policy for the user is identified in response to the detection of the user operating the motor vehicle. Further, a networked mobile device of the user to which the policy pertains is determined. Still yet, the networked mobile device of the user is controlled according to the policy while the user is operating the motor vehicle.

21 Claims, 5 Drawing Sheets

SYSTEM, METHOD, AND COMPUTER PROGRAM FOR POLICY DRIVEN CONTROL OF A NETWORKED MOBILE DEVICE OF A MOTOR VEHICLE DRIVER

FIELD OF THE INVENTION

The present invention relates to control of mobile devices, and more particularly to policy-based control of mobile devices.

BACKGROUND

Use of mobile devices while driving a motor vehicle has recently been found to be a fast growing public safety hazard. To help ensure public safety, in some geographical regions laws have been implemented to make it unlawful for a driver of a motor vehicle to use a mobile device. Unfortunately, these laws do not necessarily prevent drivers from using mobile devices while driving.

In addition, while policies have been utilized to control mobile devices, traditional policy based control of mobile devices has been limited to schedules or other static triggers (e.g. features of the mobile device, messaging/call targets, etc.). In this way, traditional policy based control of mobile devices has been incapable of addressing the public safety hazard of drivers using mobile devices while driving.

There is thus a need for addressing these and/or other issues associated with the prior art.

SUMMARY

A system, method, and computer program product are provided for policy driven control of a networked mobile device of a motor vehicle driver. In use, a user operating a motor vehicle is detected. Additionally, a policy for the user is identified in response to the detection of the user operating the motor vehicle. Further, a networked mobile device of the user to which the policy pertains is determined. Still yet, the networked mobile device of the user is controlled according to the policy while the user is operating the motor vehicle.

DETAILED DESCRIPTION

Figure 1:
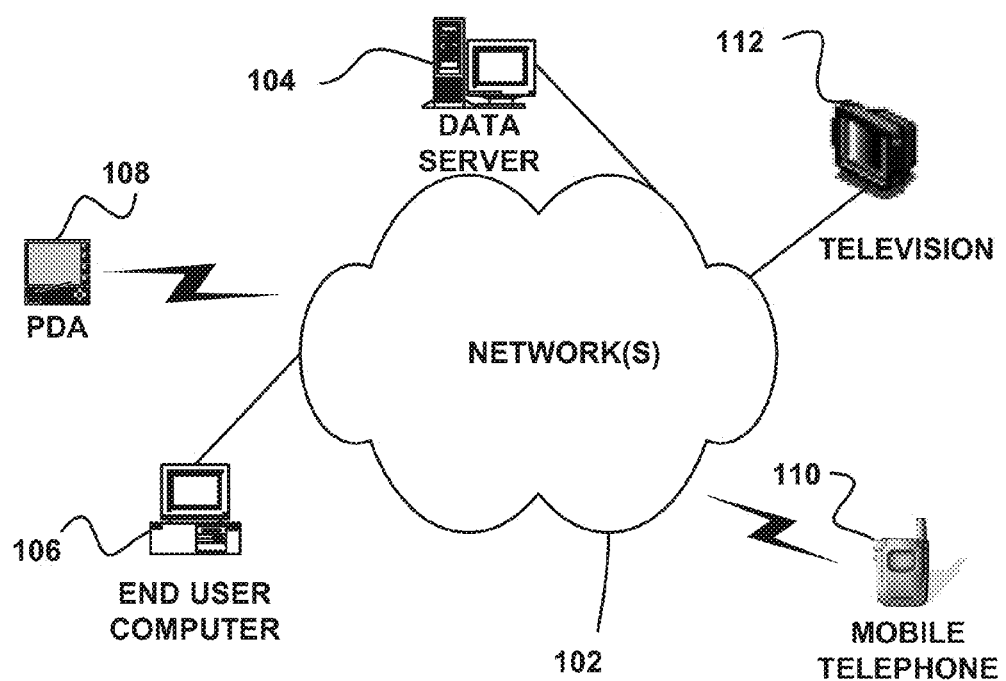
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
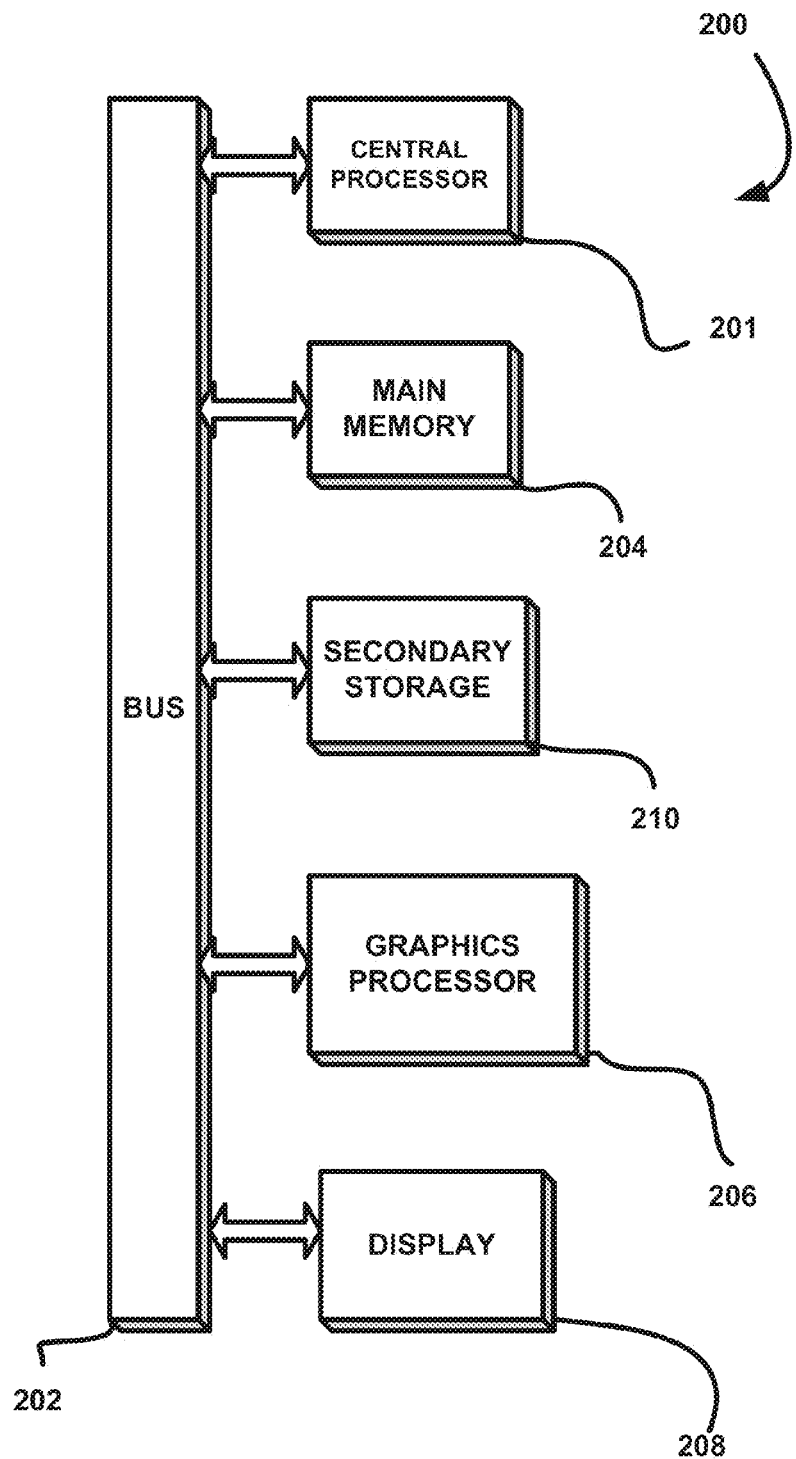
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
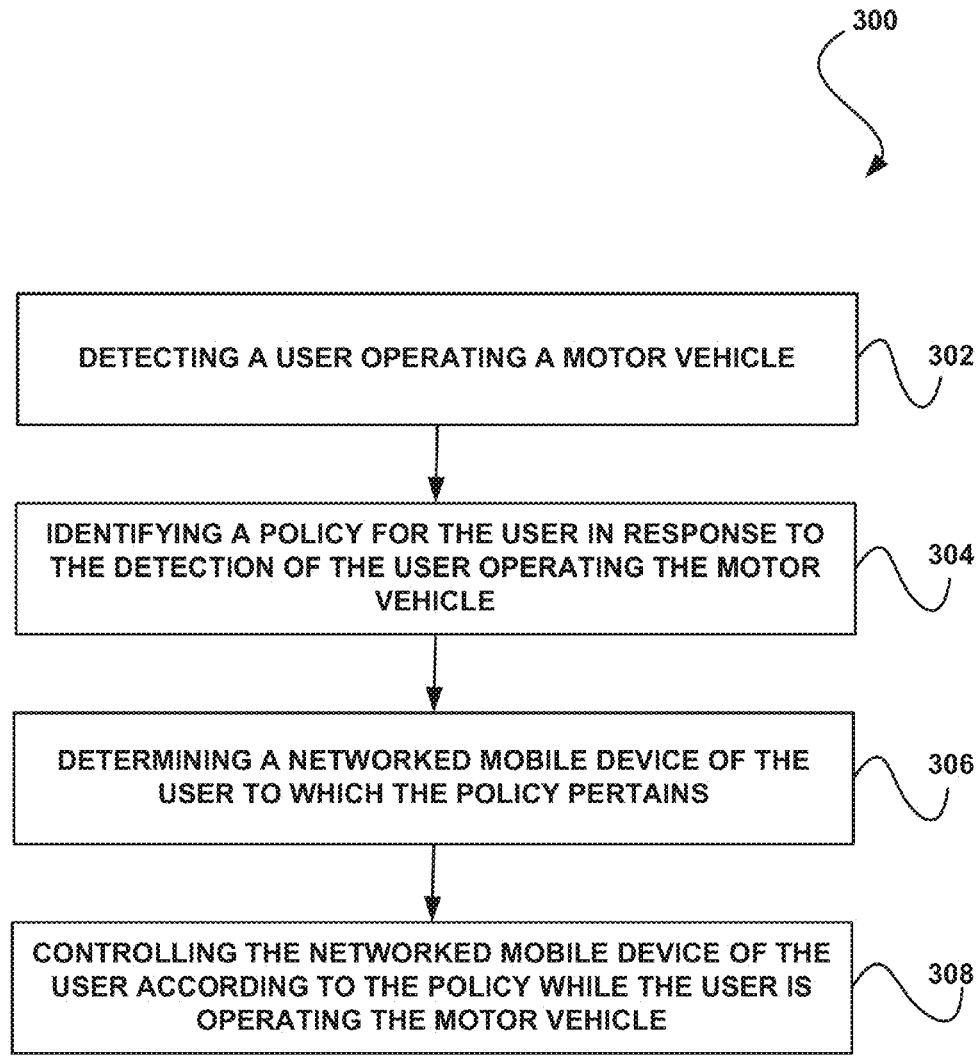
FIG. 3 illustrates a method for policy driven control of a networked mobile device of a motor vehicle driver, in accordance with one embodiment.

FIG. 3 illustrates a method 300 for policy driven control of a networked mobile device of a motor vehicle driver, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a user operating a motor vehicle is detected. The motor vehicle may be a car, motorcycle, bus, or any other vehicle that powered by a motor. Furthermore, operating the motor vehicle may include powering up (i.e. starting) the vehicle, driving the vehicle (where the vehicle is in motion), keeping an engine of the vehicle idle, etc. Thus, the user operating the motor vehicle may be a driver driving the motor vehicle, in one embodiment.

The operation of the motor vehicle by the user may be detected in any desired manner. In one embodiment, the operation may be detected using a technique for collecting telematics (e.g. state, use, etc.) on the motor vehicle (e.g. using a motor vehicle sensor). One example of such a collection technique is described in U.S. Patent Publication No. 2011/0196571, filed Feb. 9, 2010, by Foladare et al. and entitled "System And Method For The Collection And Monitoring Of Vehicle Data," which is herein incorporated by reference in its entirety.

Additionally, as shown in operation 304, a policy for the user is identified in response to the detection of the user operating the motor vehicle. In the context of the present description, the policy is any predefined ruleset capable of being utilized for controlling at least one aspect of a networked mobile device of the (e.g. used by) user, as described in more detail below. The policy may therefore be specific to the user or specific to a mobile device of the user. In either case, the policy may be identified based on an identification of the user (e.g. by retrieving the policy from a data repository storing the policy using an identifier of the user). As an option, the policy may be pre-configured by an owner of the networked mobile device, a service provider providing a service to the networked mobile device, a subscriber to the service provided to the networked mobile device, another person that is separate from the user of the networked mobile device (e.g. parent/child), etc.

It should be noted that the networked mobile device may be any mobile device that is connected to a network. The network may be the internet, the service provider's telecommunications network, etc. Accordingly, the networked mobile device may be a mobile telephone, a laptop computer, a tablet computer, etc.

As noted above, the policy includes a ruleset that relates to at least one aspect of the networked mobile device. Thus, the policy may include at least one rule that relates to a feature of the networked mobile device. For example, different rules included in the policy may relate to different features of the networked mobile device.

As an option, the rule may disable the feature of the networked mobile device. In this way, the feature of the networked mobile device may be rendered inoperable by the policy. As described in more detail below, the rule may be triggered by the user operating the motor vehicle, such that the feature of the networked mobile device may be disabled when the user is operating the motor vehicle.

In one embodiment, the feature may be a telecommunications service of (e.g. used by) the networked mobile device. Such telecommunications service may be provided to (and therefore consumable by) the networked mobile device from a telecommunications service provider. For example, the feature may be receiving incoming calls (e.g. to all or only to predetermined telephone numbers), initiating outgoing calls (e.g. to all or only to predetermined telephone numbers), incoming and/or outgoing short message service (SMS) messaging, etc.

In another embodiment, the feature may be data services of (e.g. used by) the networked mobile device. Such data services may be provided to (and therefore consumable by) the networked mobile device from a data service provider. Such data services may include access to the Internet. Of course, however, the data services may include access to any network for receiving and/or transmitting data (e.g. files, applications, packets, etc.).

Further, as shown in operation 306, a networked mobile device of the user to which the policy pertains is determined. As noted above, the networked mobile device may be a mobile telephone, a laptop computer, a tablet computer, or any other mobile device of the user that is connected to a network. Optionally, the policy may include an identifier of the networked mobile device to which it pertains (i.e. to which it is to be applied for controlling the same).

Still yet, as shown in operation 308, the networked mobile device of the user is controlled according to the policy while the user is operating the motor vehicle. As described above, the policy may include at least one rule for disabling a feature of the networked mobile device. Accordingly, controlling the networked mobile device of the user according to the policy may include disabling the feature of the networked mobile device.

For example, the rule may include a condition which triggers the disabling of the feature of the networked mobile device. Such condition may be that the user is operating the motor vehicle. Thus, in response to the detection of the user's operation of the motor vehicle, the networked mobile device of the user may be automatically controlled according to the policy by automatically disabling the feature of the networked mobile device.

By controlling the networked mobile device of the user according to the policy of the user based on the detection of the user's operation of the motor vehicle, real-time enforcement of the policy may be provided. In one embodiment, the control may be performed remotely. For example, the policy may be evaluated remotely from the networked mobile device and actions required by the policy (e.g. disabling the feature of the networked mobile device) may be performed by remotely commanding the networked mobile device (e.g. over a network) to take the action. As another example, the policy may be evaluated (e.g. based on telematics provided by a sensor in the motor vehicle) and an indication of whether to allow/deny functionality of the networked mobile device may be provided to a network provider servicing the networked mobile device, such that the network provide may accordingly enable/change/disable services on the network for the networked mobile device based on the policy. In this way, the networked mobile device may avoid having any software installed for effectuating the policy enforcement.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
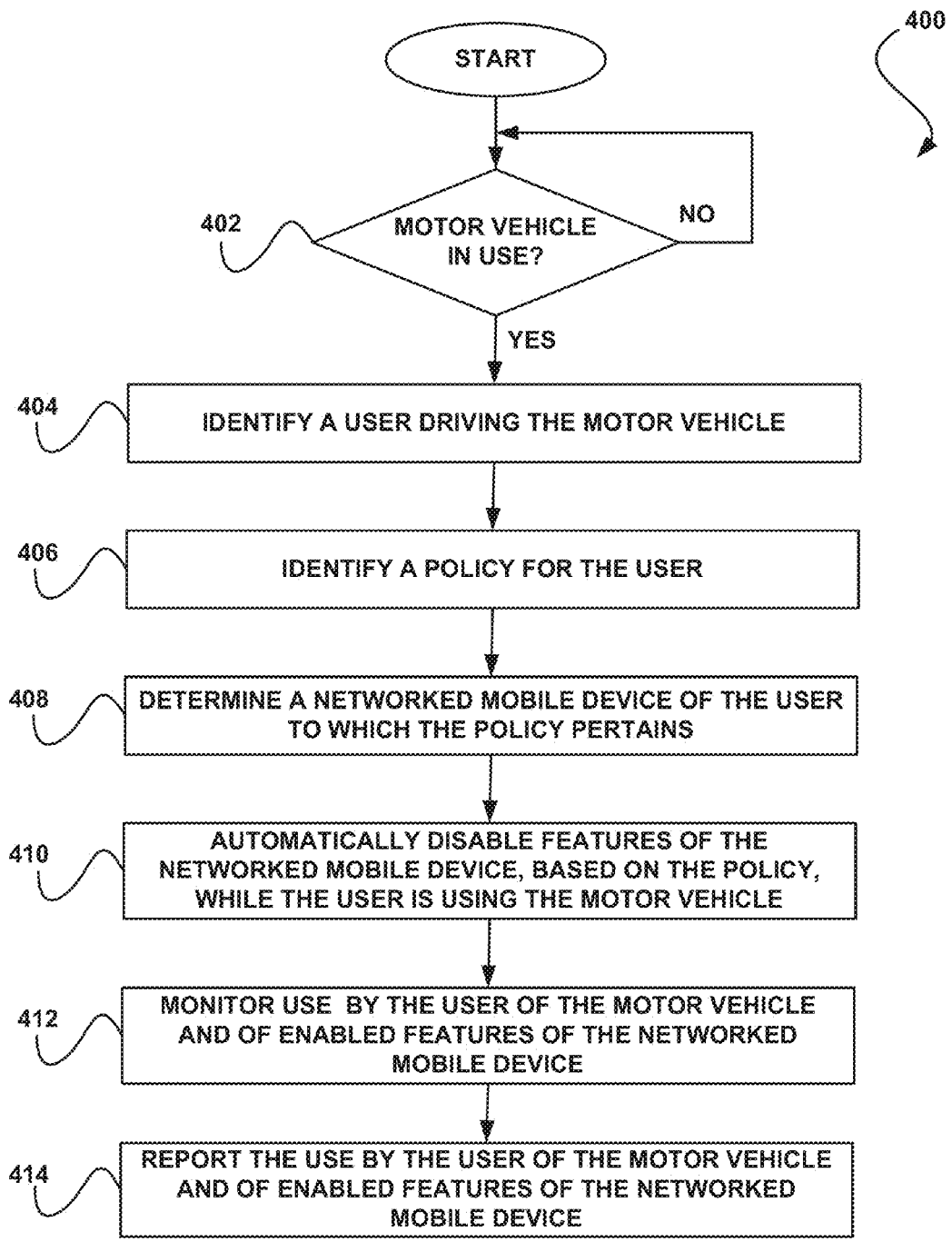
FIG. 4 illustrates a method for automatically disabling features of a networked mobile device of a motor vehicle driver and monitoring usage of enabled features of the networked mobile device, in accordance with another embodiment.

FIG. 4 illustrates a method 400 for automatically disabling features of a networked mobile device of a motor vehicle driver and monitoring usage of enabled features of the networked mobile device, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether a motor vehicle is in use. With respect to the present embodiment, the motor vehicle may be in use if the motor vehicle is being operated by a user. Such a determination may be made using a vehicle sensor which is capable of detecting a state of the motor vehicle (i.e. powered off, idle, moving, etc.), for example.

If it is determined that a motor vehicle is not in use, the method 400 continues to wait for a determination that the motor vehicle is in use. Once it is determined that a motor vehicle is in use, a user driving the motor vehicle is determined. Note operation 404. The user may be determined using a telematics device, such as that described in U.S. Patent Publication No. 2011/0196571. For example, the specific user may be determined using a location based service (LBS), radio frequency identification (RFID), a code entered by the user, etc.

Additionally, a policy for the user is identified, as shown in operation 406. The policy may be specific to the user (e.g. and thus applicable to all networked mobile devices of the user), in one embodiment. In another embodiment, the policy may be specific to a particular networked mobile device of the user. In either case, the policy may include an identifier of the user, for identifying the policy as being for the user.

Further, as shown in operation 408, a networked mobile device of the user to which the policy pertains is determined.

As an option, the networked mobile device to which the policy pertains may be determined from an identifier of the networked mobile device included in the policy. Such identifier may be unique to the networked mobile device, for example.

As a further option, a description of the networked mobile device to which the policy pertains may be included in the policy, for use in determining the networked mobile device to which the policy pertains. The description may be a contact address of the networked mobile device. Thus, in one embodiment, determining the networked mobile device to which the policy pertains may further include determining whether the networked mobile device is in an operable mode (i.e. powered up, etc.) by sending a message to the contact address included in the policy. For example, the networked mobile device may be determined to be in an operable mode if the networked mobile device consumes, acknowledges, responds to, etc. the message.

While note shown, it should be noted that the method 400 may conditionally proceed with operations 410-414 depending on whether the networked mobile device is determined to be in an operable mode. In one embodiment, the method 400 may proceed if it is determined that the networked mobile device is in an operable mode. In another embodiment, the method 400 may terminate if it is determined that the networked mobile device is not in an operable mode.

Still yet, features of the networked mobile device are automatically disabled, based on the policy, while the user is using the motor vehicle. Note operation 410. For example, the policy may indicate which features of the networked mobile device are to be disabled while the user is using the motor vehicle. The features may include receiving incoming calls, initiating outgoing calls, etc.

In one embodiment, it may be continuously determined whether the motor vehicle is being used by the user (e.g. by requesting a status of the motor vehicle from a sensor in the motor vehicle, etc.). In this way, the policy may be enforced only during the time that the motor vehicle is being used by the user. When the motor vehicle is not being used by the user, the policy may not necessarily be enforced, such that all features of the networked mobile device otherwise disabled by the policy are enabled.

Moreover, use by the user of the motor vehicle and of enabled features of the networked mobile device is monitored, as shown in operation 412. The monitoring of the user of the motor vehicle may be performed using a sensor included in the motor vehicle, which collects telematics on the motor vehicle, for example. The telematics may include acceleration, braking, overall smoothness, driving efficiency, driver's risk level, preventive mechanical indicators of the motor vehicle, etc. The monitoring of the enabled features of the networked mobile device may be monitored using a sensor included in the networked mobile device, which collects data describing usage of the networked mobile device, for example.

Further, the use by the user of the motor vehicle and of enabled features of the networked mobile device is reported. Note operation 414. The types of usage that are monitored/reported may be preconfigured, as an option, by an entity receiving the report describing the usage. In addition, it should be noted that the monitoring and reporting may be performed in real-time, as an option.

To this end, distractions caused by networked mobile devices while operating a motor vehicle may be prevented by employing real-time enforcement of policies to the operable features of the networked mobile devices. Just by way of example, a parent may use an application (e.g. mobile application) to monitor his child's driving behavior, control the child's networked mobile device functionality while operating a motor vehicle, and monitor usage of the enabled features of the child's networked mobile device while operating the motor vehicle.

Figure 5:
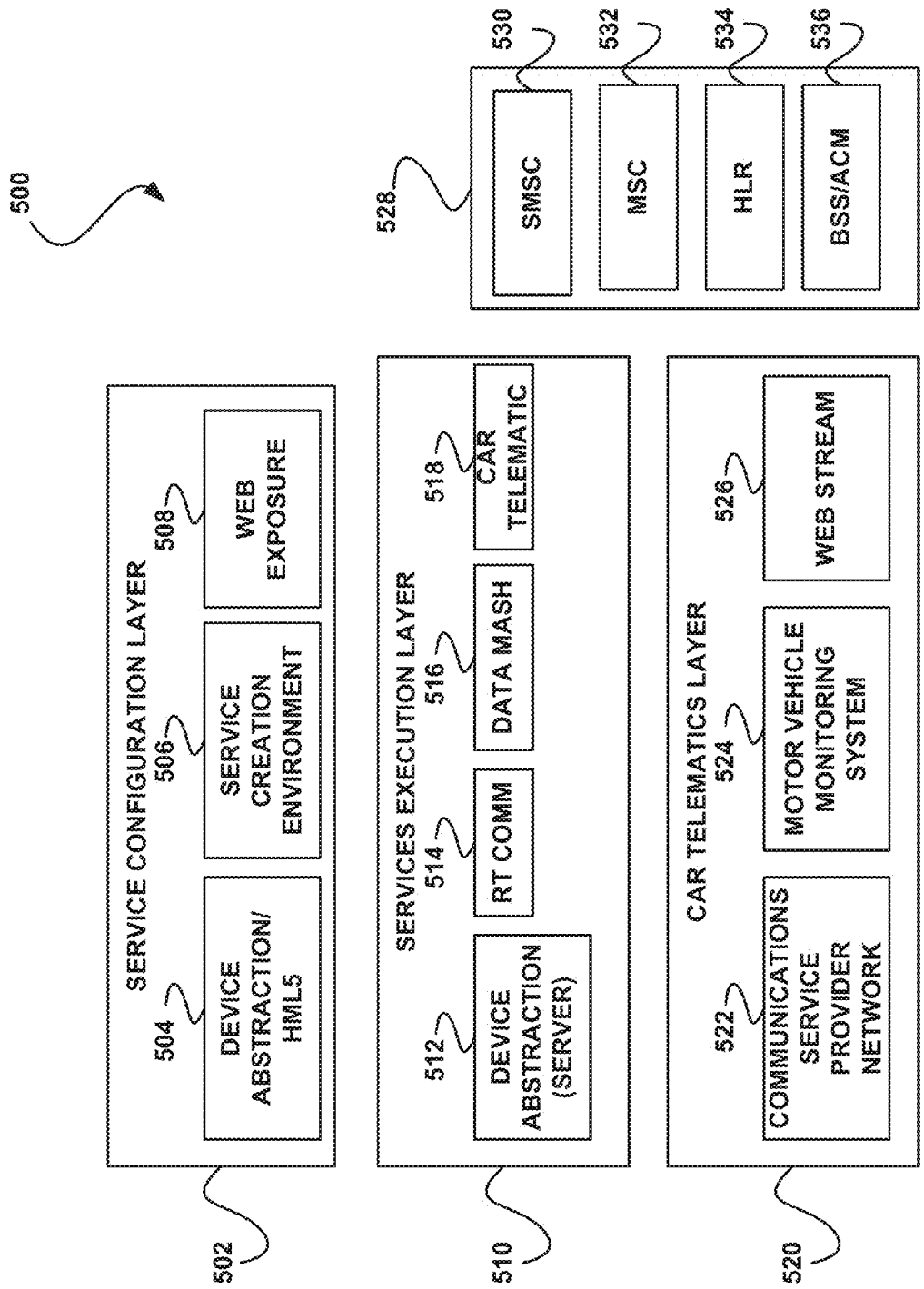
FIG. 5 illustrates a system for policy driven control of a networked mobile device of a motor vehicle driver, in accordance with one embodiment.

FIG. 5 illustrates a system 500 for policy driven control of a networked mobile device of a motor vehicle driver, in accordance with one embodiment. As an option, the system 500 may be implemented in the context of the details of FIGS. 1-4. Of course, however, the system 500 may be implemented in any desired environment. Yet again, the aforementioned definitions may equally apply to the description below.

As shown, the system includes a service configuration layer 502, a services execution layer 510, a data layer 520, and telecommunications service provider components 528. The service configuration layer 502 provides a platform allowing a user to pre-configure a policy for a networked mobile device (e.g. owned by the user, using a telecommunications service subscribed to by the user, etc.). Thus, the service configuration layer 502 includes a service creation environment 506 in which the policy can be created, a web exposure component 508 for allowing a user interface application to provision the policy in the system 500, and a device abstraction component 504 for building a UI (e.g. using HTML5).

The car telematics layer 520 includes a communications service provider network 522, a motor vehicle monitoring system 524, and a web streaming component 526. The motor vehicle monitoring system 524 determines that a motor vehicle is being operated by a user, identifies the user, and notifies the services execution layer 510 of the operation of the motor vehicle by the user.

In response, the services execution layer 510 retrieves the policy created using the service configuration layer 502 that is applicable to a networked mobile device of the user operating the motor vehicle, and enforces the policy. For example, the services execution layer 510 uses its own device abstraction component 512 to evaluate the policy and disables features provided by the telecommunications service provider components 528, according to the policy. As shown, the features may be provided by a short message service center (SMSC) 530, a message service center (MSC) 532, a home location register (HLR) 534, and/or a business support system (BSS) 536. Specifically, a mobile telephony network (not shown) servicing the networked mobile device may interrogate the service platform (e.g. services execution layer 510) for policy enforcement (e.g. for receiving an indication of whether usage of the networked mobile device can be carried out or should be dropped/blocked. The telephony network may then allow/deny the usage of the networked mobile device according to the indication provided by the service platform.

In addition, the motor vehicle monitoring system 524 may provide the services execution layer 510 with telematics 518 describing the motor vehicle, and the communications service provider network 522 may provide the services execution layer 510 with real-time communications 514 on the usage of the networked mobile device by the user. The services execution layer 510 may combine the telematics 518 and the real-time communications 514 to form a report 516. The report 516 may then be provided to the user that pre-configured the policy, for example.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for detecting a user operating a motor vehicle;
   computer code for retrieving, using an identifier of the detected user, a policy for the detected user from a repository storing a plurality of policies, in response to the detection of the user operating the motor vehicle;
   computer code for determining a networked mobile device of the detected user to which the policy pertains;
   computer code for evaluating the policy remotely from the networked mobile device; and
   computer code for remotely controlling the networked mobile device of the detected user, based on the evaluation of the policy, while the detected user is operating the motor vehicle.

2. The computer program of claim 1, wherein detecting the user operating the motor vehicle includes detecting the user driving the motor vehicle.

3. The computer program of claim 1, wherein the policy includes at least one rule.

4. The computer program of claim 3, wherein the at least one rule relates to a feature of the networked mobile device.

5. The computer program of claim 4, wherein the computer program is operable such that the at least one rule is triggered by the user operating the motor vehicle.

6. The computer program of claim 4, wherein the computer program is operable such that the at least one rule disables the feature of the networked mobile device.

7. The computer program of claim 4, wherein controlling the networked mobile device of the user according to the policy includes disabling the feature of the networked mobile device.

8. The computer program of claim 7, wherein the feature of the networked mobile device that is disabled is a telecommunications service of the networked mobile device.

9. The computer program of claim 8, wherein the feature of the networked mobile device that is disabled is receiving incoming calls.

10. The computer program of claim 8, wherein the feature of the networked mobile device that is disabled is receiving incoming calls from predetermined telephone numbers.

11. The computer program of claim 8, wherein the feature of the networked mobile device that is disabled is initiating outgoing calls.

12. The computer program of claim 8, wherein the feature of the networked mobile device that is disabled is initiating outgoing calls to predetermined telephone numbers.

13. The computer program of claim 8, wherein the feature of the networked mobile device that is disabled is short message service messaging.

14. The computer program of claim 7, wherein the feature of the networked mobile device that is disabled is data services of the networked mobile device.

15. The computer program of claim 14, wherein the data services include access to the Internet.

16. The computer program of claim 1, wherein the networked mobile device is a mobile telephone.

17. The computer program of claim 1, wherein the computer program is operable such that the policy is pre-configured by an owner of the networked mobile device.

18. The computer program of claim 1, wherein the retrieved policy includes an identifier of the networked mobile device for which the retrieved policy pertains.

19. A method, comprising:
   detecting a user operating a motor vehicle;
   retrieving, using an identifier of the detected user, a policy for the detected user from a repository storing a plurality of policies, in response to the detection of the user operating the motor vehicle;
   determining a networked mobile device of the detected user to which the policy pertains;
   evaluating the policy remotely from the networked mobile device; and
   remotely controlling the networked mobile device of the detected user, based on the evaluation of the policy, while the detected user is operating the motor vehicle, utilizing a processor.

20. A system, comprising:
   a processor for:
      detecting a user operating a motor vehicle;
      retrieving, using an identifier of the detected user, a policy for the detected user from a repository storing a plurality of policies, in response to the detection of the user operating the motor vehicle;
      determining a networked mobile device of the detected user to which the policy pertains;
      evaluating the policy remotely from the networked mobile device; and
      remotely controlling the networked mobile device of the detected user, based on the evaluation of the policy, while the detected user is operating the motor vehicle.

21. The system of claim 20, wherein the processor is coupled to memory via a bus.

* * * * *